United States Patent [19]

Ishizuka et al.

[11] Patent Number: 4,499,042

[45] Date of Patent: Feb. 12, 1985

[54] PRODUCTION OF HEAT-SHRINKABLE POLYIMIDE FILMS

[75] Inventors: Takashi Ishizuka; Yasuhiro Moriyama; Masao Nakamura, all of Osaka, Japan

[73] Assignee: Nitto Electric Industrial Co., Ltd., Osaka, Japan

[21] Appl. No.: 481,960

[22] Filed: Apr. 4, 1983

Related U.S. Application Data

[63] Continuation of Ser. No. 238,279, Feb. 25, 1981, abandoned.

[30] Foreign Application Priority Data

Feb. 25, 1980 [JP] Japan .................................. 55/23020

[51] Int. Cl.³ .............................................. B29D 7/02
[52] U.S. Cl. ................................ 264/205; 264/288.4; 264/290.2; 528/353
[58] Field of Search .................. 264/205, 288.4, 290.2; 528/353

[56] References Cited

U.S. PATENT DOCUMENTS 3,528,937  9/1970  Reynolds et al. .................... 264/205
3,835,120  9/1974  Bach et al. ........................... 528/353
4,290,936  9/1981  Sosaki et al. ........................ 528/353

OTHER PUBLICATIONS

*Encyclopedia of Polymer Science and Technology*, Mark et al., Wiley & Sons, NYC, vol. 2, pp. 339–345.

*Primary Examiner*—James Lowe
*Attorney, Agent, or Firm*—Sughrue, Mion, Zinn, Macpeak and Seas

[57] ABSTRACT

A heat-shrinkable polyimide film which comprises a polyimide film prepared by converting at least about 50% by weight of polyamide acid obtained by reacting a biphenyltetracarboxylic acid dianhydride represented by the general formula

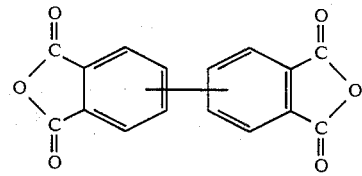

with an aromatic diamine into polyimide, and stretched in at least one direction to provide heat-shrinkability, and a process for producing the film.

6 Claims, No Drawings

PRODUCTION OF HEAT-SHRINKABLE POLYIMIDE FILMS

This is a continuation of application Ser. No. 238,279, filed Feb. 25, 1981 now abandoned.

FIELD OF THE INVENTION

The present invention relates to heat-shrinkable polyimide films and a process for producing the same.

BACKGROUND OF THE INVENTION

Hitherto, electrically insulating tapes obtained by applying a tack adhesive to a surface of a plastic film and cutting such into a suitable width have been used as electrically insulating materials for coating electrical wieres or splicing cables, etc.

Recently, improvement of various types of properties including the heat resistance of the electrically insulating materials has been further required. However, this requirement cannot often be met with the above-described electrically insulating tapes.

Hence, in order to meet this requirement, electrically insulating materials comprising a polyimide film to which a silicone resin adhesive is applied or a thin layer of tetrafluoroethylene-hexafluoropropylene copolymer (referred to as FEP, hereinafter) is provided have been used. These electrically insulating materials comprising a polyimide film as a main component have improved heat resistance as compared with the above-described electrically insulating tapes. however, since the silicone resin adhesive or FEP has inferior heat resistance to that of the polyimide resin, use of such materials is restricted to use at a temperature less than their heat resistant temperature. Accordingly, they are not satisfactory, yet, because the excellent heat resistance of the polyimide resin itself cannot be utilized.

SUMMARY OF THE INVENTION

The present invention provides heat-shrinkable polyimide films which sufficiently exhibit the inherent excellent heat resistance of the polyimide resin and have an excellent adhesive property to objects to be coated.

Specifically, the present invention provides a heat-shrinkable polyimide film comprising a polyimide film prepared by converting at least about 50% by weight of the polyamide acid obtained by reacting a biphenyltetracarboxylic acid dianhydride represented by the general formula

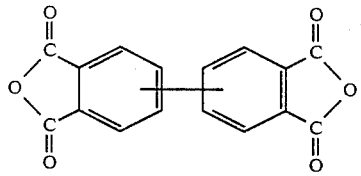

with an aromatic diamine into polyimide, and stretched in at least one direction to provide heat-shrinkability.

DETAILED DESCRIPTION OF THE INVENTION

Examples of biphenyltetracarboxylic acid dianhydrides (referred to herein as BPDA) which can be used for obtaining the heat-shrinkable polyimide films of the present invention include 3,4,3',4'-BPDA, 2,3,3',4'-BPDA and 2,3,2',3'-BPDA, etc. Among them, 3,4,3',4'-BPDA is particularly preferred.

Examples of aromatic diamines which can be reacted with the above-described BPDA include m-phenylenediamine, p-phenylenediamine, 4,4'-diaminodiphenylmethane, 4,4'-diaminodiphenyl ether, 4,4'-diamino-diphenylpropane, 4,4'-diaminodiphenyl sulfide, 4,4'-diaminodiphenyl sulfone, 3,3'-diaminodiphenyl sulfone, 1,5-diaminonaphthalene, 2,6-diaminonaphthalene and 3,4'-diaminobenzanilide, etc. Among them, 4,4'-diaminodiphenyl ether is particularly preferred.

These BPDA's and aromatic diamines may be used alone, respectively, or may be used as a mixture of two or more of each of them.

The heat-shrinkable polyimide films of the present invention are prepared by reacting the above-described BPDA with an aromatic diamine to obtain polyamide acid, converting at least about 50% by weight, probably, about 60 to about 90% by weight, of the resulting polyamide acid into the imide form to obtain a polyimide film, stretching the resulting film in at least one direction to a stretching ratio of about 1.05 to about 5 to produce heat-shrinkability.

The imide conversion ratio in the above-described polyimide film (ratio of polyimide units to the sum of polyamide acid units and polyimide units) is about 50% by weight or more. The imide conversion ratio can be obtained by calculating the ratio of light absorbance at 1,770 cm$^{-1}$ in the infrared absorption spectrum due to absorption of the imide group to the light absorbance of 1,720 cm$^{-1}$ due to absorption of the amide acid group (this method is designated infrared analysis, hereinafter).

In the present invention, the polyimide film having such a composition is stretched in at least one direction to produce a heat-shrinking property in the film. The stretching ratio, which may be varied depending on the stretching direction or the number of stretching axes, is in the range of about 1.05 to about 5.

In production of such a heat-shrinkable polyimide film, the present invention involves producing a film by flow-molding of a solution of polyamide acid having an inherent viscosity of about 0.5 or more obtained by reacting a biphenyltetracarboxylic acid dianhydride represented by the general formula

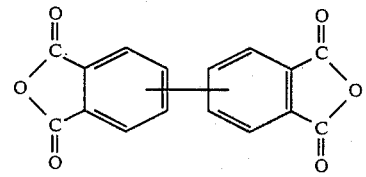

with an aromatic diamine in an organic polar solvent, drying the film until the volatile material content becomes about 10% by weight or less to produce a polyimide film wherein at least about 50% by weight of polyamide acid is converted into a polyimide, and stretching thereafter the polyimide film in at least one direction to a stretching ratio of about 1.05 to about 5 to produce a heat-shrinking property.

In the present invention, the above-described BPDA and aromatic diamine are reacted, first, in an organic polar solvent such as N,N-dialkylcarboxylamides such as N,N-dimethylformamide, N,N-diethylformamide, N,N-dimethylacetamide, N,N-diethylacetamide or N,N-dimethylmethoxyacetamide, etc., dimethyl sulfoxide, N-methyl-2-pyrrolidone, dimethyl sulfone or hexamethylphosphoramide, etc.

The concentration of BPDA and aromatic diamine in the organic polar solvent during the reaction may be varied depending on various factors, and the concentration is generally about 5 to about 30% by weight and preferably 10 to 25% by weight. Further, the reaction temperature is generally about 80° C. or less and preferably 5° to 50° C., and the reaction time is generally about 1 to about 10 hours or so.

Further, in the present invention, the BPDA, the aromatic diamine and the organic polar solvent may be used alone, respectively, or may be used as a mixture of two or more kinds thereof, respectively. In addition, solvents including aromatic hydrocarbons such as benzene, toluene or xylene, etc., ethers such as dioxane, etc., ketones such as methyl ethyl ketone, etc., alcohols such as methanol or ethanol, etc., or phenols such as phenol or cresol, etc., can be used together with the organic polar solvent.

When the BPDA reacts with the aromatic diamine in the organic polar solvent, polyamide acid is formed and the viscosity of the solution increases as the reaction proceeds. In the present invention, a solution of polyamide acid having an inherent viscosity of about 0.5 or more is obtained. If the inherent viscosity of the solution of polyamide acid is less than about 0.5, polyimide films having low mechanical strength are obtained in the film making step using the above-described solution of polyamide acid which follows. Since these films are easily broken on stretching, it is difficult to obtain heat-shrinkable polyimide films with such films.

The inherent viscosity of the solution of polyamide acid used in the present invention is a calculated value which is obtained using the following formula (I) after measurement of the viscosity of a solution obtained by dissolving polyamide acid removed from the solution of polyamide acid in a prescribed solvent.

$$\text{Inherent Viscosity} = \frac{\text{Natural Logarithm } (\log e) \frac{\text{Viscosity of Solution}}{\text{Viscosity of Solvent}}}{C} \quad (I)$$

where C in the above-described formula (I) is the number of grams of polyamide acid in 100 ml of the solution.

The resulting solution of polyamide acid is viscous, the viscosity of which measured with a B-type viscometer at 30° C. is generally about 10 to $10^8$ poises when the concentration of polyamide acid is 5 to 30% by weight.

The solution of polyamide acid obtained by reacting BPDA with aromatic diamine in an organic polar solvent as described above is then molded in the present invention into a film by a flow-molding process to produce a polyimide film.

The film forming step for producing the polyimide film from the solution of polyamide acid preferably is carried out by flowing the solution of polyamide acid on a base composed of glass or stainless steel, etc., volatilizing a part of the solvent with maintaining the temperature at generally about 20° to 200° C. and preferably 80° to 150° C. to form a film, and heating the film additionally to about 200° to 500° C. so that the volatile material content in the film becomes about 10% or less.

If the content of volatile material such as residual organic polar solvent in the polyimide film obtained in the film forming step and water formed by ring closure on conversion of polyamide acid into polyimide. etc., is more than about 10% by weight, the so-called blooming phenomenon by which the film becomes cloudy occurs in the stretching step carried out after the film forming step. The polyimide film with blooming phenomenon is not preferred, because mechanical properties such as tensile strength or elongation, etc., deteriorate.

The volatile material content of the polyimide films in the present invention is a value calculated using the following formula (II).

$$\text{Volatile Material Content (\% by weight)} = \frac{W - Wd}{W} \times 100 \quad (II)$$

where, in the above-described formula (II), W is the weight of the polyimide film before drying, and Wd is the weight of the polyimide film after drying at 350° C. for 2 hours.

The solution of polyamide acid may be applied by flowing the solution directly in the film forming step of the present invention. But it is possible to flow the solution after the viscosity thereof is adjusted by dilution with a suitable solvent or by heating the solution.

In this film forming step, polyamide acid is converted into polyimide. The imide conversion ratio can be measured using the above-described infrared analysis. When the imide conversion ratio of the polyimide film used in the present invention was measured using this infrared analysis, the ratio was found to be 50% by weight or more.

The final step used to produce the films of the present invention is a stretching step to produce heat-shrinkability which comprises stretching the polyimide film obtained through the step of reacting BPDA and the aromatic diamine and the film forming step in at least one direction.

The stretching ratio in this stretching step is about 1.05 to about 5. In stretching multiaxially, the stretching ratio is set such that the stretching ratio in each direction is in the above-described range. When the stretching ratio is less than about 1.05, it is impossible to provide heat-shrinking properties capable of practical use. When the stretching ratio is more than about 5, the polyimide film is easily broken in the stretching.

The temperature in the stretching step of the present invention may vary from room temperature (about 20°-30° C.) to the zero-strength point of the polyimide film depending upon the volatile material content of the film. In obtaining the same stretching ratio, the smaller the volatile content is, the higher the stretching temperature is. Further, the larger the volatile material content is (but less than about 10% by weight), the lower the stretching temperature is. In practical use, the stretching temperature is set in the range of about 100 to about 500° C. and preferably 200° to 350° C. Suitable stretching processes which can be used include (a) a process which comprises stretching the film using a difference in rate of revolution of a plurality of revolving heated metal rolls, (b) a process which comprises stretching under pressing by passing the film between two revolving heated metal rolls, (c) a process which comprises stretching the film using a difference in rate between the drawing-out rate and winding rate by providing pinch rolls before and after one or a plurality of metal rolls or bars heated and contacting the film with these metal rolls or bars, (d) a process which comprises stretching the film using a tentering machine (crosswise monoaxial stretching machine) disposed between two rolls revolving at nearly the same rate, or (e) a process which comprises stretching the film using a difference in rate between a supply roll and a winding roll provided before and after a tentering machine simultaneously with stretching by the tentering machine (biaxial stretching).

The volatile material content in the heat-shrinkable polyimide film obtained by this stretching step is at the most 2% by weight or so.

If a polyimide film having a particularly large heat-shrinking ratio is desired, it is preferred to utilize process (a), (b) or (c) for stretching. According to these processes, a high stretching ratio can be easily obtained, because the direction perpendicular to the stretching direction is free and unrestricted, by which a polyimide film having a large heat-shrinking ratio can be obtained.

Thus the resulting heat-shrinkable polyimide films shrink on heating to a temperature higher than the stretching temperature. It is, of course, possible to heat-shrink at a temperature lower than the stretching temperature, too. It is, however, necessary to heat to a temperature higher than the stretching temperature if complete restoration from the stretching is desired.

In the heat-shrinkable polyimide film, the higher the stretching ratio is, the higher the heat-shrinking ratio is. In the present invention, films having a heat-shrinking ratio at a maximum of about 80% are obtained. It has been understood that there is the following relation between the stretching ratio and the heat-shrinking ratio. Namely, a film having a stretching ratio of 2 shrinks with heat to at a maximum of about 50%, that having a stretching ratio of 3 shows a heat-shrinking ratio at a maximum of about 67%, that having a stretching ratio of 4 shows a heat-shrinking ratio at a maximum of about 75%, and that having a stretching ratio of 5 shows a heat-shrinking ratio at a maximum of about 80%.

The above-described heat-shrinking ratio is a calculated value obtained using the following formula (III) after a measurement which comprises printing two marks with a fixed interval (interval between the marks in this case is L) in the stretching direction on the heat-shrinkable polyimide film, heating the film to a prescribed temperature to cause heat-shrinking, cooling the film to room temperature, and measuring the interval between the marks ($L_o$).

$$\text{Heat-Shrinking Ratio (\%)} = \frac{L - L_o}{L} \times 100 \qquad \text{(III)}$$

The thickness of the heat-shrinkable polyimide film in the present invention is generally about 5 to about 250$\mu$ and preferably 10 to 100$\mu$. This thickness is for use of the film as a single layer and the thickness in using the film as a laminate will be, of course, larger than the above-described range. Further, the heat-shrinking rate of the heat-shrinkable polyimide films depends upon the thickness thereof and the temperature of the heat-shrinking operation. Where the stretching ratio is equal, the time required for stretching is extended the thickness of the film increases, and it is shortened the temperature for heat-shrinking operation increases. In films having a thickness in the above-described range, if the temperature at heat-shrinking operation is higher than the heat-stretching temperature, the films generally shrink with heat until they show the maximum heat-shrinking ratio within about 10 minutes.

According to the present invention, the heat-shrinkable polyimide films can be easily applied to objects to be coated, because they shrink with heating themselves with firm adhesion occurring to the objects to be coated when they are wound on the objects to be coated such as square copper wires, etc., and heated to a prescribed temperature. Furthermore, they can be used without providing a silicone resin adhesive layer or an FEP thin layer as an adhesive layer for the objects to be coated in contrast to prior polyimide films, and the excellent heat resistance of polyimide resin itself is exhibited sufficiently. Moreover, they can be widely used not only as electrically insulating materials but also as heat-insulating materials and anticorrosive materials for piping, etc.

According to the present invention, since polyamide acid having an inherent viscosity of about 0.5 or more is used as polyamide acid formed by reacting BPDA with an aromatic diamine, polyimide films having high mechanical strength, which do not break even if the stretching ratio is relatively large, can be obtained.

Futher, blooming phenomenon upon stretching does not occur in the polyimide films, because the volatile material content of the film is about 10% by weight or less.

Moreover, heat-shrinkable polyimide films having a desired heat-shrinking ratio can be obtained without breaking of the film occurring, because the stretching ratio is in a specified range.

The present invention is illustrated in greater detail with reference to the following examples. Unless otherwise indicated, all parts, percents, ratios and the like are by weight.

EXAMPLE 1

1,176 g (4 mols) of 3,4,3',4'-BPDA and 800 g (4 mols) of 4,4'-diaminodiphenyl ether were reacted in 14.5 kg of N-methyl-2-pyrrolidone at 5°–30° C. for 5 hours to prepare a solution of polyamide acid having a solution viscosity (value at 30° C. by a B-type viscometer) of 2,700 poises and an inherent viscosity of 2.5.

This solution of polyamide acid was then allowed to flow onto a stainless steel endless belt having a width of 400 mm and a length of 20 m and dried for 20 minutes in a drying furnace at 150° C. at a rate of 0.2 m/min to form a film having a volatile material content of 24% by weight. The film was further dried for 15 minutes in a drying furnace heated to 250°–300° C. to obtain a long polyimide film having a thickness of 45$\mu$, a volatile material content of 2.2% by weight and an imide conversion ratio of 78%.

Thereafter, the long polyimide film was introduced into two pairs of pinch rolls disposed in a heating furnace kept at 250° C. at a prescribed interval. The rate of the pinch rolls at the drawing-out side was controlled to 0.5 m/min and that of the pinch rolls at the winding side was controlled to 1.0 m/min, by which the film was stretched in the longitudinal direction to a stretching ratio of 2 to obtain a long heat-shrinkable polyimide film having a thickness of 32$\mu$.

In order to evaluate the heat shrinking ratio of the above-described heat-shrinkable polyimide film, the film was cut in the longitudinal direction to produce a long strip having a length of 200 mm (width of 20 mm) and two marks were printed at an interval of 100 mm. This sample strip was allowed to stand in a drying furnace at 300° C. for 5 minutes, and it was then removed from the drying furnace and cooled to room temperature. When the interval between the marks was measured, it was found to be 50 mm which meant that the heat-shrinking ratio was 50% and the stretching was completely eliminated.

EXAMPLE 2

The same type of long polyimide film as produced in Example 1 was stretched by the same type of stretching machine as in Example 1 under the conditions of a temperature of 270° C., a rate of the pinch rolls at the drawing-out side of 0.5 m/min, and a rate of the pinch rolls at the winding side of 2.0 m/min to a stretching ratio of 4 in the longitudinal direction of the film to obtain a heat-shrinkable polyimide film having a thickness of 20μ.

When the maximum heat shrinking ratio of this heat-shrinkable polyimide film was measured in the same manner as in Example 1, the ratio was 75% which meant that the stretching was completely eliminated.

For comparison, the same procedures as described above were carried out except that the rate of pinch rolls at the winding side was 3.0 m/min. When production of a heat-shrinkable polyimide film stretched 6 times in the longitudinal direction was attempted, the polyimide film broke and a long heat-shrinkable polyimide film could not be obtained.

EXAMPLE 3

1,176 kg (4 mols) of 3,4,3',4'-BPDA and 792 g (4 mols) of 4,4'-diaminodiphenylmethane were reacted in 11.2 kg of N,N-dimethylformamide at 5°–30° C. for 5 hours to obtain a solution of polyamide acid having a solution viscosity (value at 30° C. by a B-type viscometer) of 5,600 poises and an inherent viscosity of 1.8.

This solution of polyamide acid was then allowed to flow onto a stainless steel endless belt in the same manner as in Example 1 and dried for 13 minutes in a drying furnace at 135° C. to form a film having a volatile material content of 18% by weight. The film was further dried for 30 minutes in a drying furnace at 250°–350° C. to obtain a long polyimide film having a thickness of 42μ, a volatile material content of 0.05% by weight and an imide conversion ratio of 86%.

Thereafter, this long polyimide film was introduced into a pair of metal rolls having a width of 500 mm and a diameter of 350 mm kept at 300° C. to stretch with pressing (stretching in the longitudinal direction of the polyimide film), by which a long heat-shrinkable polyimide film having a stretching ratio of 1.5 and a thickness of 30μ was obtained.

When the maximum heat-shrinking ratio of this long heat-shrinkable polyimide film was measured in the same manner as in Example 1 except that the heating temperature was 350° C., the ratio was 33% which meant that the stretching was completely eliminated.

EXAMPLE 4

The same type of long polyimide film as that described in Example 3 was stretched with heating at a roll temperature of 250° C. using the same type of stretching machine to a stretching ratio of 1.2 in the longitudinal direction, by which a long heat-shrinkable polyimide film having a thickness of 39μ was obtained.

When the maximum heat-shrinking ratio of this long heat-shrinkable polyimide film was measured in the same manner as in Example 1, the ratio was 16% which meant that the stretching was completely eliminated.

In order to examine the adhesion of the heat-shrinkable polyimide film to an object to be coated, this film was cut in the longitudinal direction to a width of 12.5 mm to obtain a tape. When this tape was wound on a square copper wire having a section width of 7 mm and a thickness of 1.5 mm and a length of 300 mm using a half-wrapping method and allowed to stand for 10 minutes in a drying furnace at 300° C., the film thermally shrank and adhered firmly to the square copper wire. When the resulting copper wire having a coated layer was bent to an angle of 90°, the adhesion of the coated layer was well maintained without a change occurring.

For comparison, a heat-shrinkable polyimide film having a thickness of 40μ was obtained in the same manner as described above except that the stretching ratio was 1.02. With this film, cutting, winding and drying were carried out in the same manner as described above to obtain a square copper wire with a coating layer. When this copper wire was bent at an angle of 90°, the coating layer partially separated and peeled off from the copper wire.

EXAMPLE 5

1,176 g (4 mols) of 2,3,3',4-BPDA, 640 g (3.2 mols) of 4,4'-diaminodiphenyl ether and 86.4 g (0.8 mol) of m-phenylenediamine were reacted in 10.8 kg of N,N-dimethylacetamide at 5°–30° C. for 5 hours to obtain a solution of polyamide acid having a solution viscosity (value at 30° C. by a B-type viscometer) of 3,200 poises and an inherent viscosity of 1.2.

Then, this solution of polyamide acid was allowed to flow onto a rotating stainless steel drum having a width of 400 mm and a diameter of 2.2 m and dried for 20 minutes with hot air at 123° C. to form a film having a volatile material content of 33% by weight. The film was further dried for 15 minutes in a drying furnace heated to 200°–250° C. to obtain a long polyimide film having a thickness of 58μ, a volatile material content of 8.2% by weight and an imide conversion ratio of 67%.

Thereafter, this long polyimide film was fed to three metal rolls heated to 280° C., respectively, and arranged in order. The rate of revolution of each roll was controlled so as to have a ratio of 1:1.5:1.8, and the film was stretched so as to have a stretching ratio in the longitudinal direction of 1.8 to obtain a long heat-shrinkable polyimide film having a thickness of 42μ.

When the maximum heat shrinking ratio of this heat-shrinkable polyimide film was measured in the same manner as in Example 1 (except that the time in the drying furnace was 10 minutes), the ratio was 44%, which meant that the stretching was completely eliminated.

Further, when the mechanical properties of this heat-shrinkable polyimide film were measured using ASTM-D882-64T, the tensile strength in the longitudinal direction was 48 kg/cm$^2$ and the elongation was 30%.

For comparison, a film having a volatile material content of 33% by weight was formed from the above-described solution of polyamide acid in the same manner. This film was dried for 5 minutes in a drying furnace heated to 200°–250° C. to obtain a long polyimide film having a thickness of 60μ and a volatile material content of 15% by weight. This polyimide film was stretched in the same manner as described above to obtain a long heat-shrinkable polyimide film having a thickness of 41μ.

In this heat-shrinkable polyimide film containing a large amount of volatile materials, blooming was occurred throughout the film. Further, although the heat shrinking ratio was 44% which was similar to the present invention, the tensile strength in the longitudinal direction was 13 kg/cm² and the elongation was 8%, which were markedly inferior to those of the film of the present invention.

EXAMPLE 6

1,176 g (4 mols) of 3,4,3',4'-BPDA and 800 g (4 mols) of 4,4'-diaminodiphenyl ether were reacted in 17.8 kg of N-methyl-2-pyrrolidone at 5°-30° C. for 6 hours to obtain a solution of polyamide acid having a solution viscosity (value at 30° C. by a B-type viscometer) of 15,200 poises and an inherent viscosity of 3.5.

After this solution of polyamide acid was heated to 45° C. to control the viscosity thereof, the film was allowed to flow onto the same type of endless belt as that described in Example 1 and dried for 20 minutes in a drying furnace at 150° C. to form a film having a volatile material content of 27% by weight. The film was further dried for 15 minutes in a drying furnace at 250°-300° C. to obtain a long polyimide film having a thickness of 51μ, a volatile material content of 5.4% by weight and an imide conversion ratio of 74%.

Thereafter, this long polyimide film was stretched using the stretching machine of the type described in Example 1 under the conditions of a temperature of 250° C., a rate of pinch rolls at the drawing-out side of 0.5 m/min and a rate of the pinch rolls at the winding side of 1.5 m/min to a stretching ratio of 3 in the longitudinal direction, by which a long heat-shrinkable polyimide film having a thickness of 26μ was obtained.

When the maximum heat shrinking ratio of this heat-shrinkable polyimide film was measured in the same manner as in Example 1, the ratio was 67%, which meant that the stretching was completely eliminated.

Further, when adhesion of this film to the object to be coated was evaluated in the same manner as in Example 4, the film firmly adhered to the square copper wire and the adhesion of the coating layer did not change even if the resulting copper wire with the coating layer was bent to an angle of 90°.

While the invention has been described in detail and with reference to specific embodiments thereof, it will be apparent to one skilled in the art that various changes and modifications can be made therein without departing from the spirit and scope thereof.

What is claimed is:

1. A process for producing a heat-shrinkable polyimide film which comprises forming a film by
flow molding a solution of organic solvent-soluble polyamide acid having an inherent viscosity of about 0.5 or more obtained by reacting a biphenyltetracarboxylic acid dianhydride represented by the general formula

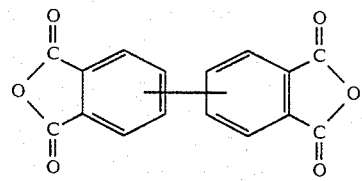

with an aromatic diamine other than aromatic azo diamines in an organic polar solvent, drying said film until the volatile material content becomes about 10% by weight or less to produce a polyimide film wherein at least about 50% by weight of polyamide acid is converted into polyimide, and stretching thereafter said polyimide film in at least one direction to a stretching ratio of about 1.05 to about 5 to provide heat-shrinkability.

2. The process for producing a heat-shrinkable polyimide film according to claim 1, wherein said biphenyltetracarboxylic acid dianhydride is 3,4,3',4'-biphenyltetracarboxylic acid dianhydride, 2,3,3',4'-biphenyltetracarboxylic acid dianhydride, or 2,3,2',3'-biphenyltetracarboxylic acid dianhydride and said aromatic amine is m-phenylenediamine, p-phenylenediamine, 4,4'-diaminodiphenylmethane, 4,4'-diaminodiphenyl ether, 4,4'-diaminodiphenylpropane, 4,4'-diaminodiphenyl sulfide, 4,4'-diaminodiphenyl sulfone, 3,3'-diaminodiphenyl sulfone, 1,5-diaminonaphthalene, 2,6-diaminonaphthalene or 3,4'-diaminobenzanilide.

3. The process for producing a heat-shrinkable polyimide film according to claim 2, wherein said biphenyltetracarboxylic acid dianhydride is 3,4,3',4'-biphenyltetracarboxylic acid dianhydride and said aromatic amine is 4,4'-diaminodiphenyl ether.

4. The process for producing a heat-shrinkable polyimide film according to claim 1, wherein said film is stretched biaxially with a stretching ratio in each direction of about 1.05 to about 5.

5. The process for producing a heat-shrinkable polyimide film according to claim 1, wherein a solution of said polyamide acid has an inherent viscosity of about 0.5 or more.

6. The process for producing a heat-shrinkable polyimide film according to claim 1, wherein said polyimide film has a volatile material content of about 10% by weight or less.

* * * * *